US006865258B1

(12) United States Patent
Polcyn

(10) Patent No.: US 6,865,258 B1
(45) Date of Patent: Mar. 8, 2005

(54) METHOD AND SYSTEM FOR ENHANCED TRANSCRIPTION

(75) Inventor: Michael J. Polcyn, Allen, TX (US)

(73) Assignee: Intervoice Limited Partnership, Reno, NV (US)

( * ) Notice: Subject to any disclaimer, the term of this patent is extended or adjusted under 35 U.S.C. 154(b) by 0 days.

(21) Appl. No.: 09/374,462

(22) Filed: Aug. 13, 1999

(51) Int. Cl.⁷ .......................... H04M 1/64; H04M 3/00
(52) U.S. Cl. ................. 379/88.01; 52/88.02; 52/88.07; 52/265.01; 52/265.09; 52/266.07; 52/265.06
(58) Field of Search ........................... 379/52, 671, 75, 379/88.01, 88.02, 88.07, 88.13, 88.16, 88.17, 93.15, 100.09, 100.13, 442.14, 265.01, 265.09, 266.01, 266.07, 265.06; 704/235, 260, 270

(56) References Cited

U.S. PATENT DOCUMENTS

| | | | |
|---|---|---|---|
| 5,003,574 A | | 3/1991 | Denq et al. |
| 5,128,982 A | | 7/1992 | Dugdale et al. |
| 5,181,236 A | * | 1/1993 | LaVallee et al. ............. 379/67 |
| 5,519,808 A | | 5/1996 | Benton, Jr. et al. |
| 5,867,562 A | * | 2/1999 | Scherer ...................... 379/88 |
| 6,006,183 A | * | 12/1999 | Lai et al. .................... 704/235 |
| 6,170,011 B1 | * | 1/2001 | Macleod Beck et al. ... 709/224 |
| 6,230,197 B1 | * | 5/2001 | Beck et al. ................. 709/223 |
| 6,233,314 B1 | * | 5/2001 | Engelke ...................... 379/52 |
| 6,350,066 B1 | * | 2/2002 | Bobo, II ................ 395/200.36 |
| 6,510,220 B1 | * | 1/2003 | Beckett, II et al. ..... 379/265.06 |

FOREIGN PATENT DOCUMENTS

EP  0 924 687 A  6/1999  ............ G10H/1/00

OTHER PUBLICATIONS

International Search Report (PCT/US00/21935) dated Nov. 24, 2000.
"Improved Correction of Speech Recognition Errors Through Audio Playback", IBM Technical Disclosure Bulletin, vol. 36, No. 06A, pp. 153–154, Jun. 1993.
"Method For Lowering Branching Factors In Forms Filling Applications", IBM Technical Disclosure Bulletin, vol. 38 No. 07, pp. 525–526, Jul. 1995.

* cited by examiner

Primary Examiner—Allan Hoosain
(74) Attorney, Agent, or Firm—Fulbright & Jaworski LLP

(57) ABSTRACT

A method and system for performing enhanced transcription is disclosed. In a preferred embodiment, a transcription application may automatically transcribe information provided in a message. For instance, the application may automatically convert audio (e.g., voice) data, and/or other data types provided within a message to textual form. Additionally, the transcription application may automatically populate data entry fields with corresponding data from a message. Moreover, the transcription application may indicate a level of confidence for the data automatically transcribed. Furthermore, in a preferred embodiment, the transcription application may monitor the transcriber's activity and automatically adjust the presentation of data to be transcribed according to such activity. For example, the transcription application may monitor the transcriber's focus, e.g., by determining the location of the cursor, and the application may automatically adjust the presentation of data to correspond with such focus. As another example, the transcription application may monitor the typing activity of a transcriber during manual transcription and automatically adjust the presentation of the message data in accordance with such typing.

38 Claims, 2 Drawing Sheets

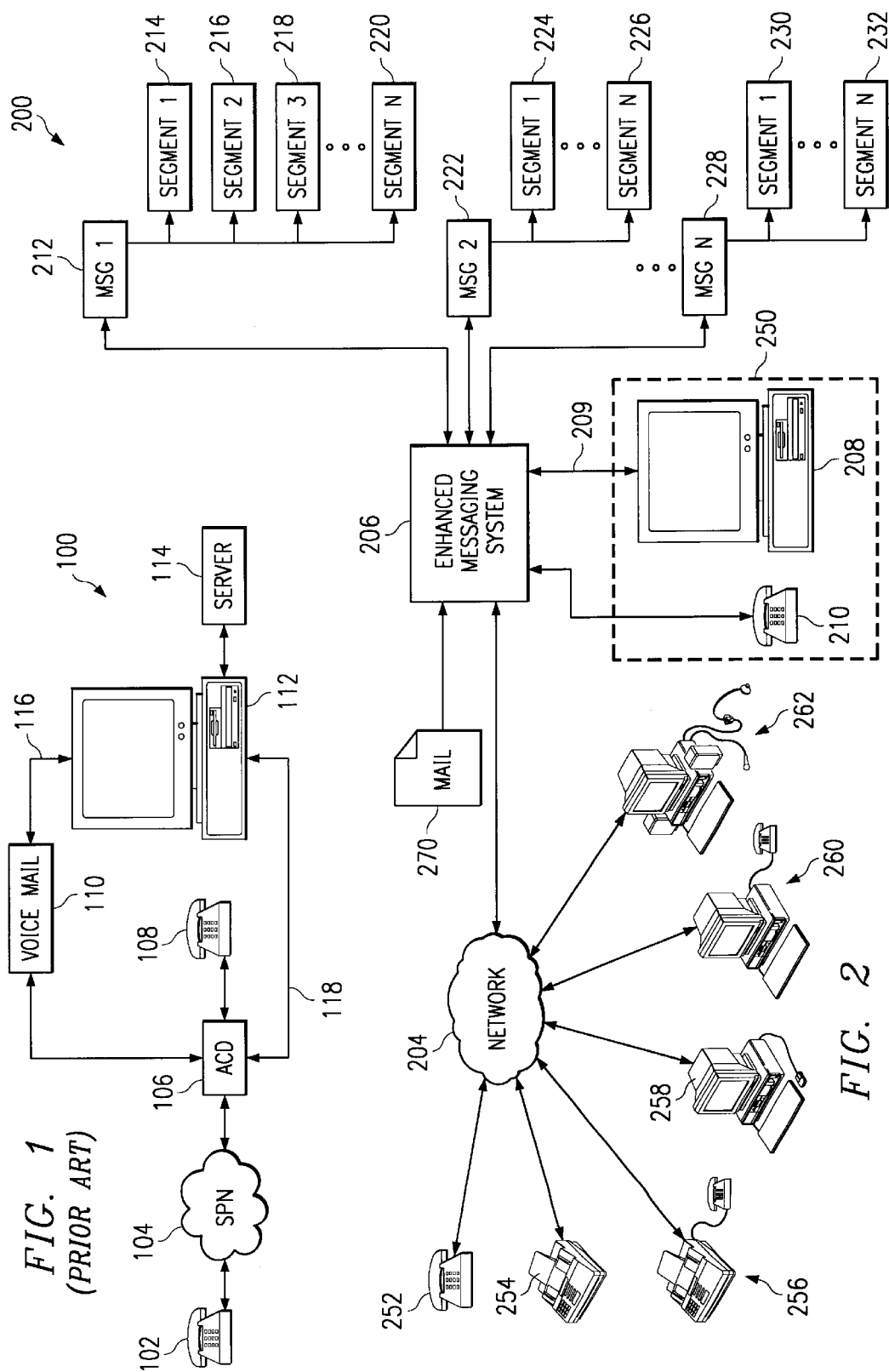

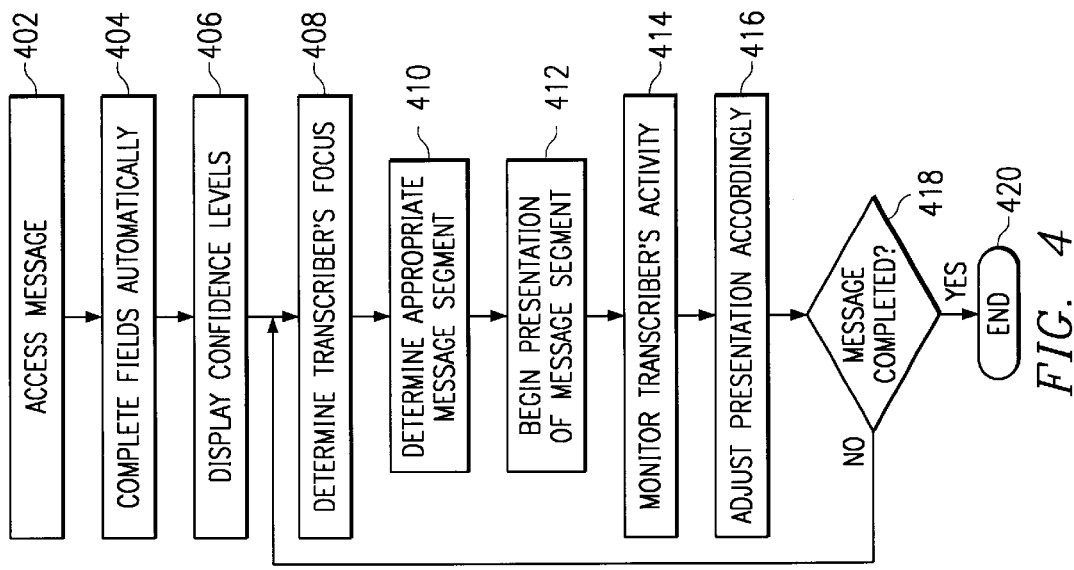
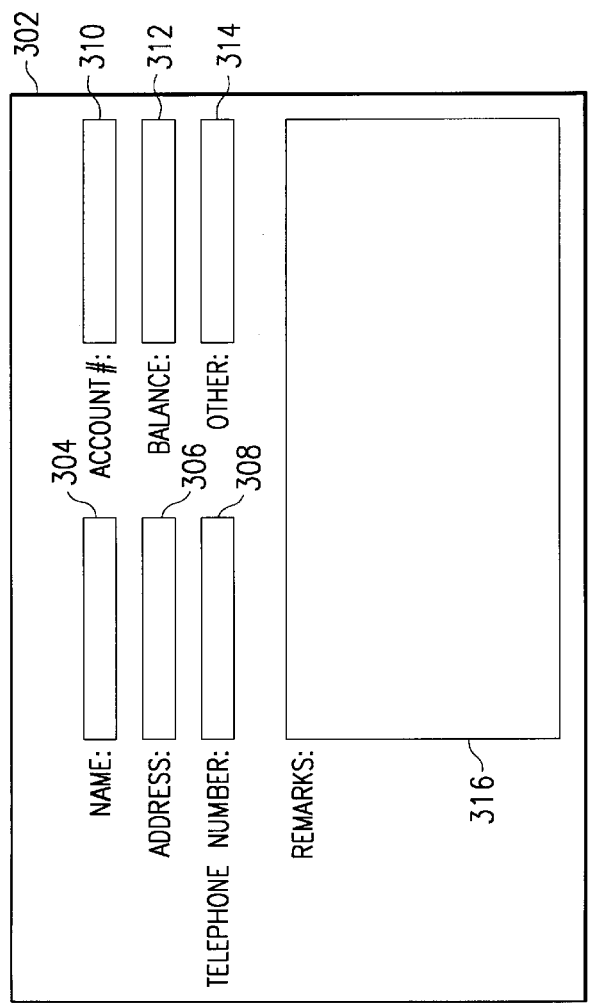
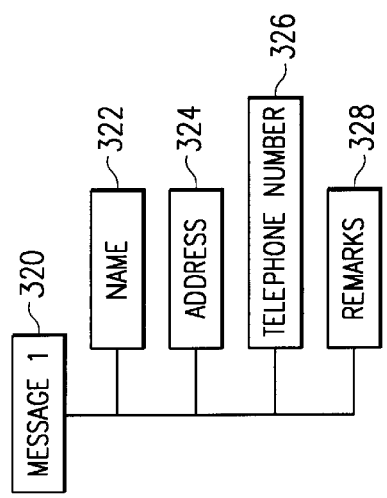

METHOD AND SYSTEM FOR ENHANCED TRANSCRIPTION

RELATED APPLICATIONS

This application is related to co-pending and commonly assigned U.S. patent application Ser. No. 08/199,677 filed May 2, 1994, entitled "AUTOMATIC CALL BACK SYSTEM AND METHOD OF OPERATION." now U.S. Pat. No. RE37.073, which is a reissue of U.S. Pat. No. 5,155,761 filed Jan. 26, 1990 having the same title, now abandoned, and co-pending and commonly assigned U.S. patent application Ser. No. 09/374,452 filed concurrently herewith and now abandoned entitled "METHOD AND SYSTEM FOR ENHANCED MEDIA MESSAGING," the disclosures of which are hereby incorporated herein by reference.

TECHNICAL FIELD

The present invention relates in general to transcription, and in specific to a system and method for enhanced transcription of messages.

BACKGROUND

Voice recording is commonly used in the prior art for transcription purposes, and companies in that marketplace have developed systems devoted to transcription. Such systems typically are stand-alone systems that record messages from a microphone or record telephone messages. Once a message is recorded either from a microphone, telephone, or other recording mechanism, prior art systems typically allow a user manual control of playback of the recorded message to transcribe such message. Generally, a mechanism, such as a foot pedal, is utilized for controlling the playback of a message while an individual agent (or "user") transcribes the message. That is, a foot pedal is typically utilized to allow a user to select functions as "Play," "Rewind," "Stop," and "Fast Forward."

Further, prior art voice messaging systems, and particularly voice mail systems, have evolved to allow for some partitioning of voice messages to reflect segmentation or "forms" based voice input. For example, a voice message can be segmented into a name field, an address field, and a telephone number field. Again, such systems are typically stand-alone systems. Moreover, such systems require a user transcribing a recorded segmented message to listen to the message and control the playback of such message either using the touch-tone keypad of a telephone (in the case of voice mail), or the recording devices typically used for transcribing a message in the prior art, such as a pedal.

Voice messaging has been implemented with telephony applications of the prior art, such as call center applications. For example, suppose a caller, Caller One, calls a call center application of the prior art. Further suppose that the call center offers callers the option of leaving a voice mail message, e.g., "press 1 to leave a voice message." After holding for an extended period of time, Caller One chooses to leave a voice message. When Caller One chooses to leave a voice message (e.g., by pressing 1 on his touch-tone telephone), Caller One is connected to a voice message application, where Caller One records a voice message. Thereafter, an agent of the call center may retrieve the recorded message and transcribe such message. Typically, an agent retrieves a recorded message from prior art voice messaging systems using a telephone. For example, an agent may use a telephone to access the voice messaging system and provide an access code (e.g., by entering DTMF signals or voice commands) to allow the agent to retrieve voice messages. Thereafter, as described above, the agent manually controls the playback of a recorded message, e.g., by using voice or DTMF commands on the telephone or using another control device, such as a foot pedal.

A transcription application may be utilized in transcribing a voice message which provides the transcriber with a data entry form used for organizing information received in a message. That is, many transcribers are required to enter information from a voice message into a particular data entry form. For instance, such a form may provide a "name" field, "address" field, and "telephone" number field, as well as many other fields, into which a transcriber enters information from a voice message. In prior art systems, a transcriber is required to manually control the playback of a message in order to obtain and transcribe the information needed for each field. Additionally, in the prior art, a transcriber is typically required to manually transcribe information from a message into a data entry form or other type of transcription form.

SUMMARY OF THE INVENTION

Several problems exist with the prior art methods and systems for transcribing messages. First, in the prior art, the transcriber uses manual controls, such as a foot pedal, to control the playback of the message. If the transcriber types at a faster or slower rate than the recorded message is being played, the system may allow the transcriber to manually adjust the playback speed of the message or the transcriber may be forced to adapt to a particular playback speed. In either case, prior art messaging systems do not monitor the transcriber's activity and automatically adjust the playback of the message to the transcriber's activity. Rather, a transcriber must utilize manual controls to "Stop," "Play," "Rewind," "Pause," "Fast Forward," and perform other necessary functions to adapt the playback of a message to the transcriber's activity.

A related problem occurs when working with segmented messages of the prior art. Suppose a caller records a segmented message, wherein the first segment is the caller's name, the second segment is the caller's address, and the third segment is the caller's telephone number. Suppose a transcriber desires to first type in the caller's telephone number. The transcriber must manually advance the playback of the segmented message through the first two segments to the third segment in order to hear the caller's telephone number. Thus, prior art voice messaging systems provide no mechanism for monitoring the transcriber's activity and automatically providing the desired segment. Rather, the transcriber is required to manually adjust the voice message to the desired segment, or adapt the transcriber's activity to the playback format. Moreover, the transcriber is required to manually transcribe the data from a message into a data entry form or other document. That is, a data entry form may be presented to the transcriber that comprises data entry fields that correspond to the segments of a message, and the transcriber is required to manually transcribe data from each segment into the appropriate data field.

In view of the above, there exists a desire for a method and system for performing transcription. Further there exists a desire for a method and system for transcription wherein all or part of a message is automatically transcribed. Additionally, there exists a desire for a method and system for transcription wherein automatically transcribed portions of a message are automatically entered in the appropriate fields of a data entry form. There is yet a further desire for a method and system for performing transcription wherein playback of a message to be transcribed is automatically synchronized with the transcribing activity of a transcriber.

These and other objects, features and technical advantages are achieved by a system and method which accomplish enhanced transcription. That is, these and other objects, features and technical advantages are achieved by a system and method which, in a preferred embodiment, provide automatic transcription of all or part of a message. Thereafter, in a preferred embodiment, such automatically transcribed portions of a message may be automatically entered in the appropriate fields of a data entry form. Additionally, a system and method are disclosed which, in a preferred embodiment, provide a user interface that automatically synchronizes the presentation of message data with the transcribing activity of a transcriber.

In a preferred embodiment, a transcription application may be executing to automatically transcribe all or part of the data provided in a message. In a preferred embodiment, such transcription application is implemented with a messaging system that allows messages comprising various types of data, such as audio (e.g., voice), DTMF, image, video, text, fax, e-mail, and other data types. Although, in alternative embodiments, such transcription may be implemented with a messaging system that allows only a particular type of data for messages, such as voice messages. For instance, in a preferred embodiment, the transcription application may automatically convert audio (e.g., voice) data, and/or other data types provided within a message to textual form. Additionally, the transcription application may automatically populate data entry fields with corresponding data from a message. Moreover, the transcription application may indicate a level of confidence for the data automatically transcribed. For instance, the transcription application may highlight the automatically transcribed information in various shades depending on the interface's level of confidence in converting such data to textual form.

For example, in a preferred embodiment, a large vocabulary voice recognition application can be utilized to convert audio (e.g., voice) messages to text. Similarly, portions of a message that may be represented by non-audio data types may be automatically converted to text and presented on the transcriber's computer screen. For example, image data (e.g., fax data or data scanned by an optical scanner into a system) may be converted to text using an optical character recognition (OCR) application. As another example, dual tone multi-frequency (DTMF) data provided by a caller may be automatically converted using a DTMF decoder to corresponding textual data, such as numeric data or textual data identified by such DTMF data.

Additionally, in a preferred embodiment, the transcription interface may indicate the level of confidence in such automatic transcription. For instance, the level of confidence in the recognition of particular words and their resulting conversion to text may be presented to the transcriber. For example, words may be highlighted in varying colors depending on the confidence level of the system in the transcription of each word. For instance, very low confidence may be indicated by highlighting a word in red, greater confidence may be indicated by yellow highlight, greater confidence still may be indicated by green highlight, and very high confidence may be indicated by providing a word with no highlight.

Furthermore, in a preferred embodiment, the transcription application may monitor the transcriber's activity and automatically adjust the presentation of data to be transcribed according to such activity. For example, the transcription application may monitor the transcriber's focus, e.g., by determining the location of the cursor, and the interface may automatically adjust the presentation of data to correspond with such focus. For instance, if the transcriber causes the cursor to be positioned within a data entry field for a customer's name, the transcription application may automatically adjust the presentation of the message data to the portion of the message containing the customer's name. Thus, as the transcriber accesses different data entry fields, the message presentation can automatically adjust to present the transcriber the appropriate message data for a particular field. Additionally, the fields may be accessed in any order and need not be accessed only in the order in which the message segments were recorded. For example, suppose a message has a "name" segment recorded first, then an "address" segment recorded second, and finally a "complaint" segment recorded third. When transcribing the message, a transcriber may access the complaint field first, and the transcription application will automatically adjust the message presentation to the corresponding "complaint" segment. Thus, the recorded segments are not required to be presented in the order in which the segments were recorded, and a transcriber is not required to manually adjust the message presentation to a desired portion of the message.

As another example of the transcription application monitoring the transcriber's activity and adjusting the presentation of message data, the application may monitor the typing activity of a transcriber during manual transcription and automatically adjust the presentation of the message data in accordance with such typing. Synchronizing the presentation of the message with the transcriber's activity allows the transcriber to effortlessly receive the message data in a desired manner, without being required to manually control its presentation. Therefore, the transcriber's working condition may be improved, and the transcriber's productivity level may be increased.

Furthermore, in a preferred embodiment, other tools, such as those available in many existing word processing applications, may be implemented within the transcription system to further increase the system's capabilities and a transcriber's efficiency. For example, the user interface may operate to highlight or automatically correct potential grammar problems or misspelled words. Thus, tools may be implemented within the messaging system to indicate errors and/or to automatically correct errors, which further improves a transcriber's resulting work product and efficiency.

It should be appreciated that a technical advantage of a preferred embodiment of the present invention is that a system and method for enhanced transcription are provided wherein messages may be automatically transcribed for a transcriber. Moreover, data entry fields may be automatically populated with the appropriate data from a message. A further technical advantage of a preferred embodiment of the present invention is that a system and method for enhanced transcription are provided wherein messages comprising multiple different data types can be managed for effective transcription by a transcriber. In a preferred embodiment, such multiple different data types may be automatically transcribed and presented in the appropriate data entry fields for a transcriber. A further technical advantage of a preferred embodiment of the present invention is that a system and method for enhanced transcription are provided wherein the confidence level of automatic transcription performed for a message may be indicated to a transcriber.

A further technical advantage of a preferred embodiment of the present invention is that a system and method for enhanced transcription are provided wherein message presentation is automatically synchronized with a transcriber's activity for such message. Accordingly, a transcriber is not required to manually control the presentation of the data for a message to be transcribed. Thus, a further technical advantage of a preferred embodiment of the present invention is that efficiency of a transcriber is increased by eliminating the time required in the prior art for manually adjusting/controlling presentation of a message.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 1 shows a telephony call center having a voice messaging system of the prior art;

FIG. 2 shows an exemplary system in which a preferred embodiment of the present invention may be implemented;

FIG. 3 shows an exemplary data entry screen for transcribing information from a message; and FIG. 4 shows an exemplary flow diagram that illustrates the transcription application's operation, in a preferred embodiment.

DETAILED DESCRIPTION

The present disclosure can be better appreciated after a more detailed description of prior art voice messaging and transcription systems. Turning to FIG. 1, a prior art voice messaging and transcription system 100 implemented within a telephony call center is illustrated. Although, it should be understood that a prior art voice messaging and transcription system may be implemented within other arenas in a similar fashion, as described herein for a telephony call center. As shown, a caller (or customer) utilizes telephone 102 to call a call center via switched public or private network 104. Typically, an automated call distributor (ACD) 106 is utilized within a call center to receive and route calls. That is, ACD 106 receives inbound calls and routes the calls to an appropriate agent or voice messaging system. The call center has one or more live agents that can each be reached via telephone, such as telephone 108. Thus, ACD 106 can route "live" telephone calls from customers to an agent's corresponding telephone 108. In this manner, the call center can handle live telephone calls from customers. Further, the call center has a voice mail system 110 that allows customers to leave recorded messages for the call center. For example, after a customer has been holding for a live agent for a particular period of time, ACD 106 may transfer the customer to voice mail system 110. As another example, a customer may be presented with an option, such as "Press 1 to leave a voice mail message for the call center," and after the customer chooses such option, ACD 106 transfers the customer to voice mail system 110.

Typically, each agent also has access to a computer terminal 112, on which the agent enters information about each customer's call. Computer terminal 112 generally has access to a transcription application that is typically isolated on a server or host application 114. Thus, an agent can access voice mail system 110 and utilize the transcription application to transcribe messages from voice mail system 110 on computer terminal 112. For instance, the transcription or other application executing on terminal 112 or server 114 may present the agent with a data entry screen on terminal 112 that may provide various fields in which information is to be transcribed by the agent from a retrieved message. In such a prior art system, an agent must manually control the playback of a message retrieved from voice mail system 110 and manually transcribe information provided in such a message.

As an example of such a prior art system, suppose that Customer A places a call from telephone 102 via SPN 104 to ACD 106. Further suppose that Customer A chooses an option to leave a voice mail for the call center, wherein ACD 106 transfers the call to voice mail system 110. After being transferred to voice mail system 110, Customer A interacts with voice mail system 110 to record a voice message. Voice mail system 110 may create a segmented message by interacting with Customer A. For example, voice mail system 110 may prompt Customer A to record the customer's name and "press * when complete." Thereafter, voice mail system 110 may prompt Customer A to record the customer's address and "press * when complete," and so on. As a result, voice mail system 110 may create a segmented message, wherein a single message contains various segments that are mapped to a known piece of information, such as "name," "address," etcetera. After recording the message, Customer A may disconnect from voice mail system 110, and the recorded message may be stored to await retrieval by an agent.

When an agent has a lull in inbound telephone calls, the agent can log off of the ACD 106, such that the agent will no longer be routed live calls from ACD 106. Thereafter, the agent can dial into voice mail system 110 to retrieve recorded messages. Typically, the agent must enter a password or other identification information, and then the agent can begin retrieving recorded voice messages from voice mail system 110. Thus, an agent can then have Customer A's voice message, as well as other voice messages, played back to the agent for transcribing or other handling. Typically, the interface provided to the agent by voice mail system 110 is a touch-tone interface, such that the agent is required to press touch-tone keys on his telephone keypad to manually control the playback of messages. So, as the agent is transcribing the messages, the agent performs such functions as "Play," "Rewind," "Fast Forward," and "Stop" manually by pressing touch-tone keys on his telephone keypad. Such an embodiment is undesirable because it requires the agent to focus attention not only on manually transcribing a message on computer terminal 112, but also the agent's attention must be focused on manually controlling the playback of a message utilizing telephone 108 while performing such transcription.

Also, as shown in FIG. 1, an application interface 116 from computer terminal 112 to voice mail system 110 may be provided, which allows the agent to manually control the voice mail via terminal 112. For example, the application interface 116 may allow the agent to manually control the playback by pressing certain keys on the keyboard of computer terminal 112, or by using a playback control device, such as a foot pedal, that is interfaced with computer terminal 112. Additionally, a control interface, such as a computer-telephony-integration (CTI) 118 may be provided, which allows the agent to control the functionality of the call routing of ACD 106 from computer terminal 112. Thus, an agent may "sign off" of ACD 106 from computer terminal 112 via CTI 118, such that the agent does not receive live calls, and the agent may sign on to voice mail system 110 and manually control playback of messages from terminal 112 via connection 116. This embodiment utilized in the prior art is also undesirable because it requires the agent to focus attention not only on manually transcribing a message on computer terminal 112, but also requires the agent to manually control the playback of a message utilizing computer 112 or a playback control device coupled to computer 112 while performing such transcription.

As described above, prior art messaging and transcription systems require an agent to manually control the playback of recorded messages, either using the telephone keypad, a computer terminal, or other playback control device. Additionally, prior art messaging and transcription systems require an agent to manually transcribe recorded messages. For example, prior art messages may be segmented wherein a single message contains various segments that are mapped to a known piece of information, such as "name," "address," etcetera, and an agent is typically required to manually transcribe such information from a message into corresponding fields on a data entry form.

Turning now to FIG. 2, an exemplary system in which a preferred embodiment of the present invention may be implemented is illustrated. Shown in FIG. 2 is an exemplary messaging system 200 implemented for a telephony call center. Although, it should be understood that a preferred embodiment of the present invention may be implemented within other systems to provide enhanced transcription, as disclosed herein, in many different arenas. Thus, the present invention is not intended to be limited only to the exemplary messaging system provided herein, rather such messaging system is intended as an example that renders the disclosure enabling for many other types of messaging and/or transcription systems. Additionally, the present invention is not intended to be limited only to call center systems as provided herein, rather such call center systems are intended as examples that render the disclosure enabling for many other types of systems and arenas in which enhanced transcription may be desirable.

In a most preferred embodiment, enhanced transcription is implemented within an enhanced messaging system as shown in FIG. 2 and disclosed in greater detail in commonly assigned U.S. patent application Ser. No. 09/374,452, entitled "METHOD AND SYSTEM FOR ENHANCED MEDIA MESSAGING," filed concurrently herewith, the disclosure of which is incorporated herein by reference. In a preferred embodiment, a communicating party (which may also be referred to herein as "calling party" or "customer") provides data to an "Enhanced Messaging System" (hereafter "EMS" or "messaging system") 206. EMS 206 is a system that may be embodied in a processor-based system such as a general purpose computer, a personal computer (PC), a server class microcomputer, a minicomputer or a mainframe computer. Various network elements, which may also be referred to as "communication devices" herein, may be capable of communicating with EMS 206 via network 204. Exemplary network elements 252–262 are illustrated in FIG. 2 as being interfaced with EMS 206 via network 204. However, it should be understood that other communication devices may be implemented in addition to or in place of the exemplary devices shown in FIG. 2, and any such implementation is intended to be within the scope of the present invention.

It shall be understood that network 204 may comprise any means of information communication, such as a PSN, a proprietary network, a general purpose processor-based information network, dedicated communication lines, a satellite system, a cable system, a computer network, direct device to device connection, a local area network (LAN), a wide area network (WAN), modem to modem connection, an Intranet, the Internet, or any combination thereof suitable for providing information communication between a particular network element and EMS 206. Information communication may be accomplished through network 204, for example, by such communication protocols as facsimile, file transport protocol (FTP), hypertext transfer protocol (HTTP), hypertext markup language (HTML), extensible markup language (XML), electronic mail ("e-mail"), telephony audio communication, telephony DTMF communication, or the like. Furthermore, although multiple network elements are illustrated connected to network 204, it shall be appreciated that ones of the network elements may be connected to different networks. Additionally, it shall be understood that various ones of the network elements may be coupled to EMS 206 in a real time or non-real time link. Also, various ones of the network elements may allow for communication with EMS 206 in a synchronous or asynchronous fashion.

Exemplary network element 252 is illustrated as a telephone, which provides a communicating party with voice communication capability. Such telephone 252 may also provide a communicating party with limited data transmission capability in the form of DTMF. Of course, telephone 252 may be analog or may be digital, such as is common in cellular communications. Telephone 252 may be utilized by a communicating party to access EMS 206 via network 204 to communicate voice data and/or DTMF data to EMS 206.

In addition to the above-mentioned telephone 252, various other communication devices may be utilized by a communicating party to access and communicate with EMS 206. Exemplary network element 254 is illustrated as a fax, which provides a communicating party with fax communication capability. Similarly, exemplary network element 256 is illustrated as a fax implemented with a telephone, which may provide a communicating party with voice communication, DTMF communication, and fax communication capabilities. It should be understood that a telephone may be coupled to or integrated within fax 256. It should also be understood that fax 254 and/or fax/telephone 256 may be in the form of "stand alone" fax machines, capable of accepting and printing hard copy images, or may be a fax device coupled to or implemented within a processor-based system, such as a general purpose computer system. Utilization of a fax device coupled to or implemented within a processor-based system provides means by which another application executing on the processor-based system may generate, accept and utilize the information so transmitted.

Illustrated as exemplary network elements 258, 260 and 262 are processor-based systems in three typical configurations. PCs 258, 260 and 262 may provide a communicating party with the capability of communicating in a variety of media types (data types). For example, PCs 258, 260 and 262 may provide a communicating party with e-mail communication capability. Other examples of communication capabilities that may be provided to a communicating party by PCs 258, 260, and 262 include, but are not limited to, FTP communication and HTTP communication (e.g., communicating via a website on the Internet).

PCs 260 and 262 also provide audio information communication through such means as an attached communication device (PC 260) or multimedia equipment including a microphone and speaker (PC 262). For example, PCs 260 and 262 may provide a communicating party with the capability of creating an audio file (e.g., a .wav file) and transmitting such audio file via network 204. Additionally, it should be recalled that such communication devices may be coupled to EMS 206 in a real time or non-real time link. Also, such communication devices may allow for audio, such as voice, or other communication in a synchronous or asynchronous fashion. For instance, PCs 260 and 262 may allow a communicating party to communicate in a synchronous manner via the Internet, or some other network 204. For example, PCs 260 and 262 may be multimedia PCs, such as those disclosed in co-pending patent application Ser. No. 08/719,163, filed on Sep. 24, 1996, entitled "INTERACTIVE INFORMATION TRANSACTION PROCESSING SYSTEM WITH UNIVERSAL TELEPHONY GATEWAY CAPABILITIES," having a common assignee, the disclosure of which is hereby incorporated herein by reference. Additionally, other forms of communication, such as voice over the Internet which allows audio communication to be conducted via the Internet similar to telephony communication, may be utilized in communicating data for a message to EMS 206. It shall be understood that any communication capability now known or later developed for such processor-based systems is intended to be within the scope of the present invention. Additionally, it shall be understood that configurations in addition to those illustrated currently exist, or may later be developed, which are suitable for providing information communication for a message in a preferred embodiment of the present invention.

Box 270 illustrates standard mail, such as offered through the United States Postal Service (USPS) or other mail delivery entity (including Federal Express and United Postal Service), which provides yet another form of communication available to a communicating party for communicating information to a call center. It shall be appreciated that in order to be input into EMS 206, mail 270 must be converted into electronic information. Therefore, system 200 may include input/output means such as computer terminal 208 to allow an operator to input information transmitted by mail 270. Of course, input/output means coupled to system 200 may take the form of an optical scanner and OCR system (not shown in FIG. 2) to eliminate the need for operator entry of information transmitted by mail 270, if desired.

As shown in FIG. 2, in a preferred embodiment, a communicating party can utilize one or more of the network elements to communicate via network 204 with EMS 206. Thus, a communicating party can communicate information to and/or receive information from the call center for which EMS 206 is implemented utilizing a variety of different communication devices. For example, a communicating party may utilize telephone 252 to call the call center via a switched public network (SPN) 204. Such SPN 204 may be a carrier switch for any type of telephony network using synchronous voice or packet switch network using asynchronous voice, and such SPN 204 may be a public or private network. Further, such SPN 204 may be a private branch exchange (PBX). Instead of or in addition to telephone 252, a communicating party may utilize any other communications device, such as a fax or PC, to communicate via network 204 with EMS 206 as is described more fully in U.S. patent application Ser. No. 09/374,452, entitled "METHOD AND SYSTEM FOR ENHANCED MEDIA MESSAGING."

Thus, in a preferred embodiment, a communicating party may be routed via network 204 to EMS 206. EMS 206 may comprise the appropriate interface(s) to handle the impedance matching and the electrical characteristics of whatever type of network(s) 204 to which it is attached. Further, in a preferred embodiment, EMS 206 may comprise voice capture capability, voice record capability, voice play capability, digital signal processing (DSP) resources to perform voice recognition, DTMF recognition for tone input, as well as the associated application level control logic appropriate for the messaging application. Additionally, in a preferred embodiment, EMS 206 may further comprise the capability to receive image, fax, video, email, and other types of media that may be communicated to EMS 206.

As shown in FIG. 2, in a preferred embodiment one or more agents at the call center have a work station 250 that may comprise a telephone 210 and a computer terminal 208. As shown, computer terminal 208 is connected to EMS 206 via control link 209. It should be understood that such agent may be located locally or remotely from EMS 206. Thus, control link 209 may be a direct connection to EMS 206, or control link 209 may be a network across which computer terminal 208 is capable of communicating with EMS 206. Such a network may be any type of communications network including, but not limited to direct PC to PC connection, a local area network (LAN), a wide area network (WAN), modem to modem connection, an Intranet, the Internet, a combination of the above, or any other communications network now known or later developed within the networking arts which permits two or more processor-based systems to communicate with each other.

In a most preferred embodiment, various forms of data may be communicated to the EMS 206 as a message. For example, a communicating party may use telephone 252 to contact EMS 206. EMS 206 may record audio data, such as voice, received from telephone 252. Thereafter, an agent may retrieve such audio data from EMS 206 and have the audio data played on telephone 210. It should be understood that in alternative embodiments, rather than such audio data being transmitted to an agent via telephone 210, such audio could be transmitted in digital form via control link 209 to computer terminal 208, which could then play the audio data to the agent. In other alternative embodiments, the audio may be switched back through the network 204 to another telephone available to an agent. Thus, in a preferred embodiment, the audio portion of a message can be received on computer terminal 208, on a standard local audio instrument, such as telephone 210, or through some other switch mechanism. Other data types may be received by EMS 206 as a message capable of being communicated to an agent in a similar manner. As examples, DTMF data, fax data and textual data (e.g., received via e-mail or a website) may be received as a message capable of being communicated to an agent via telephone 210, computer terminal 208 and/or other communication device(s) available to such agent (e.g., a fax machine).

In a preferred embodiment, segmented messages are utilized within EMS 206. Although, in alternative embodiments, non-segmented messages may be implemented within EMS 206. In a preferred embodiment illustrated in FIG. 2, box 212 represents a message (which may also be referred to as a data form message herein) comprising one or more segments. That is, a first message, Message 1 (212), comprises segment 1 (214), segment 2 (216), segment 3 (218) and so on through segment "N" (220). Furthermore, additional messages may exist, such as Message 2 (222) through Message "N" (228), each comprising segments of their own. In a preferred embodiment, the number of segments comprising a message may vary. For example, one call center application may have messages comprising X number of segments, and another call center application may have messages comprising Y number of segments. Accordingly, a preferred embodiment may be implemented such that a message comprises any number of segments. Moreover, a preferred embodiment may be implemented such that segments can be created dynamically for a message as needed. Thus, different messages within a single call center application may contain a different number of segments.

In a most preferred embodiment, a single message may comprise various different types of data. For example, a segment may contain audio, such as recorded voice information. Such voice information is typically represented in digital form, generally through pulse code modulation, although such voice data could be represented using other coding techniques. As a further example, a segment may contain numeric information entered via telephone touchtone, e.g., DTMF format. As still another example, a segment may contain facsimile (fax) data. Thus, such a fax segment may in fact be a representation of a graphic or image, such as that defined in typical fax machine transmissions. As still further examples, a segment may contain image data or video data. As yet a further example, a segment may contain textual data, such as may be communicated via email or via a website. It shall be understood that additional types of objects or media may be contained within one or more of the segments of a message of a preferred embodiment. Thus, the present invention is not intended to be limited only to the media (or data) types provided herein, rather such media are intended as examples that render the disclosure enabling for many other media that can be communicated to EMS 206.

Message 212 may be thought of as a "container" in which various media are gathered and organized into segments, which, in a preferred embodiment, are each mapped to indicate that they represent some known piece of information. For instance, segment 1 may represent a customer's "name," segment 2 may represent a customer's "address," segment 3 may represent a customer's "telephone number," etcetera. Thus, in a preferred embodiment, EMS 206 utilizes segmented messages, wherein the segments are mapped to particular information. In alternative embodiments, EMS 206 may utilize segmented messages, wherein the segments are not mapped to particular information, but are somehow related. For example, segments of a message may relate to the same matter (e.g., a particular customer's complaint). In such alternative embodiments, the segments may, for example, be organized in the order of communication. For example, a first segment may comprise information communicated from a communicating party in a first communication session to EMS 206, a second segment may comprise information communicated in a second session to EMS 206, and so on. Such segments may comprise a date and/or time stamp associated therewith to indicate when the data contained within such segment was received by EMS 206. Thus, in an alternative embodiment various communications relating a particular matter may be contained within segments of a single message, and all such communication may be retrieved and reviewed to ascertain the communication history for such matter.

After receiving a message from a communicating party, EMS 206 may route such message to an agent or an agent may otherwise retrieve such message, and thereafter the agent may utilize a transcription interface to accomplish enhanced transcription for the message. For example, such interface may automatically transcribe information provided in the message. For instance, the interface may automatically convert audio (e.g., voice) data, and/or other data types provided within a message to textual form. Additionally, the transcription interface may automatically populate data entry fields with corresponding data from a message. Moreover, the transcription interface may indicate a level of confidence for the data automatically transcribed. For instance, the transcription interface may highlight the automatically transcribed information in various shades depending on the interface's level of confidence in converting such data to textual form.

Furthermore, in a preferred embodiment, the transcription interface may monitor the transcriber's activity and automatically adjust the presentation of data to be transcribed according to such activity. For example, the transcription interface may monitor the transcriber's focus, e.g., by determining the location of the cursor, and the interface may automatically adjust the presentation of data to correspond with such focus. For instance, if the transcriber causes the cursor to be positioned within a data entry field for a customer's name, the transcription interface may automatically adjust the presentation of the message data to the portion of the message containing the customer's name. As another example of the transcription interface monitoring the transcriber's activity and adjusting the presentation of message data, the interface may monitor the typing activity of a transcriber during manual transcription and automatically adjust the presentation of the message data in accordance with such typing.

Turning now to FIG. 3, an exemplary data entry screen 302 comprising fields 304–316 is shown. It shall be understood that the particular look and feel of screen 302 is not critical to the present invention. Also shown in FIG. 3 is an exemplary message 320 comprising segments 322–328. In a preferred embodiment, a communicating party may communicate data for message 320, wherein such data is allocated to segments 322–328. For example, the party's name may be allocated to segment 322, address to segment 324, telephone number to 326, and remarks from the communicating party to segment 328. Such information may be communicated in one or more various types of data. Although, assume for the purpose of the present example that the data in each of the segments is audio data (e.g., voice provided by the communicating party). In a preferred embodiment, a transcriber may retrieve the recorded message 320 or such message may be routed to the transcriber.

Also, in a preferred embodiment, a transcription interface application may be executing on the transcriber's computer terminal (e.g., PC) or some other remote or local server to present data entry screen 302 to the transcriber on the transcriber's computer terminal. Additionally, in a preferred embodiment, the transcription interface application may automatically transcribe the data provided in message 320. For instance, a voice recognition application may be utilized to convert the audio data of message 320 to textual format. Technology for performing such voice recognition is well known, and therefore will not be discussed in great detail herein. Most preferably, such voice recognition application is a large vocabulary voice recognition application. Any device/application now known or later developed for performing such voice recognition can be implemented within a preferred embodiment to accomplish voice recognition, and any such implementation is intended to be within the scope of the present invention.

Moreover, in a preferred embodiment, the transcription interface application may automatically populate the appropriate data entry fields 304–316 with the corresponding information from message 320. For instance, the transcription interface application may automatically display the converted text resulting from "name" segment 322 in the "name" data entry field 304. Similarly, the transcription interface may automatically populate the data entry fields for "address" 306, "telephone number" 308 and "remarks" 316 with the converted text resulting from message segments "address" 324, "telephone number" 326, and "remarks" 328, respectively.

It shall be understood that in a preferred embodiment, message 320 may contain one or more of various different types of data. For example, message 320 may comprise audio (e.g., voice), DTMF, text, image, video, fax, and other types of data supplied by a communicating party. In a preferred embodiment, the enhanced transcription application may be capable of automatically transcribing non-audio data in a manner similar to that described above for audio data. For example, suppose message 320 comprises fax data received from a communicating party. The enhanced transcription application may utilize an OCR application to automatically convert such fax data into textual form. Any OCR application/device now known or later developed may be implemented in a preferred embodiment to perform such conversion, and any such implementation is intended to be within the scope of the present invention. Thereafter, the enhanced transcription application may automatically populate the appropriate data fields with the corresponding converted text in a manner similar to that described above.

As yet a further example, suppose message 320 comprises DTMF data received from a communicating party's touchtone telephone. A DTMF decoder may be utilized by the enhanced transcription application to automatically convert the DTMF signals to corresponding textual data (e.g., corresponding numeric data). Such DTMF data may reference some known piece of information, such as information contained within a database. For instance, when contacting a call center that handles calls regarding a particular company's products, the communicating party may be prompted to enter a product number or "press 1 for product X," "press 2 for product Y," and so on. As another example, when contacting a call center that handles customer accounts (e.g., credit accounts and/or bank accounts), the communicating party may be prompted to enter an account number. Thereafter, the transcription application (or some other application) may automatically retrieve information corresponding to the entered DTMF data. For instance, information about the identified product or account may be automatically retrieved from a database or other accessible location on a system. Such information about the identified product or account may be available in text form or it may be converted to such form, and then automatically populated in the appropriate fields of a data entry screen 302, such as fields 310, 312, and 314.

Thus, it should be understood that some of the information on data entry screen 302 may be automatically populated by information provided from a source other than a recorded message, such as message 320. As discussed above, utilizing particular information provided in message 320 in DTMF or other form, the transcription application may automatically identify and retrieve additional information from some other source, such as a database. For example, based on a the provided name, address, and telephone number, the transcription application may be able to identify and retrieve the appropriate account number and the balance for such account. Thereafter, the transcription application may automatically populate fields 310 and 312 with such account number and balance information, respectively. Other information may be automatically provided on data entry screen 302 by the transcription application, which may or may not be related or identified by message 320. For example, the transcriber's name may be retrieved from a log-in file and may be automatically provided in a data entry field, such as field 314 to identify the individual responsible for transcribing the particular message.

Once the transcription application converts a voice data type, fax data type, or other non-text data type into text, the resulting textual representation may be saved as a "mirror" segment of the original segment, in a preferred embodiment. For example, suppose segment 322 is a voice message for which the transcription application utilizes voice recognition to obtain a textual representation. A mirror segment, such as segment 322 prime (i.e., 322'), can be utilized to contain the textual representation of the original voice message, which can remain in original segment 322. Thus, a transcriber may listen to the original segment 322 to verify the automatic transcription of such segment in data field 304. Moreover, if the transcription application is unable for some reason to automatically transcribe a particular segment or if particular data entry fields are required to be manually transcribed by a transcriber (e.g., by the transcription application or a call center manager), the transcriber can manually transcribe all or a portion of such data entry field by listening to the original segment 322.

As a further example, segment 328 may contain fax data in the form of a G3 image. The transcription application may utilize an OCR application to obtain a textual representation of fax segment 328, which may be stored in segment 328 prime (i.e., 328'). As described above for segment 322, the original segment 328 may be presented to the transcriber to allow the transcriber to verify the automatic transcription of such segment in data entry field 316. Moreover, if for any reason all or a portion of fax segment 328 is not automatically transcribed, the transcriber may utilize original segment 328 to perform manual transcription. For instance, a pop-up window may be provided on the transcriber's computer terminal that presents the original fax data from segment 328 to the transcriber for verification and/or manual transcription.

Additionally, in a preferred embodiment, an indication of the confidence in the automatic transcription is provided to the transcriber. For example, suppose remarks segment 328 of message 320 comprises audio data (e.g., voice) supplied by a communicating party that communicates remarks from such party. As discussed above, the transcription application may utilize voice recognition technology to convert the voice message to text, such that the segment may be automatically transcribed and displayed in the appropriate field (e.g., 316) of data entry screen 302. A confidence level in the automatic transcription (e.g., the conversion from audio to text) can be indicated to the transcriber.

For example, each converted word displayed in field 316 may be highlighted in a particular shade or color to indicate the confidence level in the automatic transcription of the words. For instance, words for which the transcription application has very low confidence in the transcription may be highlighted or shaded in red, words for which the transcription application has somewhat low confidence may be highlight or shaded in yellow, and words for which the transcription application has high confidence may be highlighted or shaded in green. Accordingly, such shading may direct the transcriber in the familiar manner typically used for traffic signals, wherein red notifies the transcriber to take extreme caution, yellow notifies the transcriber to take some caution, and green indicates that the transcriber may proceed with little caution. Moreover, if the transcription application is extremely confident in the automatic transcription, such transcription may be presented with no highlighting or shading. It shall be understood that highlighting or shading of the resulting transcription is but one exemplary method/technique of indicating the level of confidence in a transcription. Other methods/techniques may be implemented within the transcription application to indicate the confidence level, and any such methods/techniques are intended to be within the scope of the present invention.

Once the resulting automatic transcription and confidence levels are presented to the transcriber, the transcriber may listen to the original audio message from segment 328 to ensure that the transcription is accurate, and the transcriber can manually correct any inaccuracies. It shall be understood that the confidence level for automatic transcription of other, non-voice data types, such as fax data, may be presented in a similar manner. Because the confidence level of the automatic transcription is indicated, the transcriber can pay particular attention to those words for which the confidence level is low. Also, if the confidence level is high for all or most of the transcription, the transcriber may forego listening to the original voice message altogether. Accordingly, the overall effectiveness and efficiency of the transcriber may be increased.

Furthermore, in a preferred embodiment, when a transcriber is required to manually transcribe all or a portion of a message, the presentation of the data from the message may be automatically synchronized with the transcriber's activity. As used herein, "presentation" of message data is intended to refer to audibly playing audio data, displaying image data, as well as any other method of presenting various types of data which a message may comprise. For example, in a preferred embodiment, the transcription application automatically adjusts the presentation of message data to correspond to the transcriber's focus. For instance, continuing with the example illustrated in FIG. 3, if a transcriber caused the cursor to be placed in data field 316 for "remarks," the transcription application would automatically adjust the presentation of message data to present the transcriber with data from segment 328. Thus, the transcriber may tab or enter to a particular field or use a pointing device (such as a mouse) to place the cursor in a particular field, and the transcription application will automatically adjust the presentation of data from a message accordingly. Suppose segment 328 contains audio data (e.g., voice) from a communicating party. In response to the transcriber causing the cursor to be positioned in data field 316, the transcription application may automatically begin playing the audio data from segment 328 to allow the transcriber to verify automatic transcription in field 316 and/or to manually transcribe the audio data of segment 328. Suppose instead that segment 328 contains fax data from a communicating party. In response to the transcriber causing the cursor to be positioned in data field 316, the transcription application may automatically present a pop-up window on the transcriber's computer screen displaying the fax data from segment 328 to allow the transcriber to verify automatic transcription in field 316 and/or to manually transcribe such data of segment 328.

As another example of automatically synchronizing the presentation of message data with a transcriber's activity, in a preferred embodiment, the transcription application can monitor the transcriber's typing activity (e.g., the transcriber's typing speed and if the transcriber backspaces, etcetera) during manual transcription and adjust the presentation of message data to be synchronized with the transcriber's typing. For instance, continuing with the example illustrated in FIG. 3, assume the transcriber is manually transcribing all or a portion of the data from segment 328 in data field 316. Suppose segment 328 contains audio data (e.g., voice) from a communicating party. In a preferred embodiment, the transcription application may monitor the transcriber's typing activity and automatically synchronize the presentation of data from segment 328 according to the transcriber's typing. For instance, if the transcriber is typing slowly, the transcription application may decrease the audio play speed of segment 328, or present only a few words or syllables of the audio at a time to synchronize the presentation of the audio data with the transcriber's typing. Also, if the transcriber backspaces over several words, the transcription application may adjust the playback of the audio to automatically rewind and begin playing at the appropriate position of the data that the transcriber is transcribing.

Suppose instead that segment 328 contains fax data from a communicating party, which is presented in a pop-up window to the transcriber. In a preferred embodiment, the transcription application may automatically monitor the transcriber's typing activity and adjust the presentation of such fax data accordingly. For instance, the transcription application may monitor the amount of data typed by the transcriber and automatically scroll the display of the fax data in the pop-up window down to allow the transcriber to view additional data from the fax, as needed. Accordingly, in a preferred embodiment, the transcriber is not required to manually control the presentation of message data, but rather the transcription application automatically synchronizes such presentation with the transcriber's activity.

In a preferred embodiment, some type of pre-processing may be performed by the transcription application (or other application) on the recorded audio data (e.g., voice) for messages, which allows the playback of such audio data to be adjusted to a transcriber's activity. For example, algorithms can be applied to the audio data to determine pertinent information, such as the number of syllables, length of the audio data, utterances into which the audio data is segmented, and other information. Such pre-processing may provide information that can be later used to adjust the audio playback in accordance with the transcriber's activity. For example, as discussed above, the audio data can be played one syllable or word at a time in accordance with the transcriber's activity. Additionally, the audio playback may replay a word or phrase if the agent backspaces or deletes an entry. Similar pre-processing may be performed for non-audio data types, such as fax data, to determine information useful in automatically adjusting the presentation of such data according to a transcriber's activity. For example, the length of fax data and/or the amount of data (e.g., the number of words) contained for such fax data may be determined to allow for the presentation of such data to be adjusted, such as by scrolling a display window, according to the transcriber's activity.

Additionally, in a preferred embodiment, error detection/correction tools can be included within the user interface to further assist the transcribing agent. For example, potential grammar problems and/or misspellings may be highlighted or automatically corrected. Such tools, as well as other tools for detecting/correcting typing errors, are well known and are incorporated within many existing word processing products. Accordingly, such tools are not discussed in greater detail herein beyond disclosing that they may be implemented within a preferred embodiment for transcription.

Turning now to FIG. 4, an exemplary flow diagram is shown to illustrate the operation of the transcription application, in a preferred embodiment. It shall be understood that the present invention is not intended to be limited only to the implementation illustrated by the exemplary flow diagram of FIG. 4, rather such implementation illustrated by the exemplary flow diagram of FIG. 4 is intended as an example that renders the disclosure enabling for many other implementations. As shown in FIG. 4, the transcription application accesses a message to be transcribed at block 402. The transcription application may then perform any conversion of non-text data types to text and automatically complete the data entry fields of a data entry screen at block 404. At block 406, the transcription application may display confidence levels for the portions of the message that are automatically transcribed.

At block 408, the transcription application may determine the transcriber's focus. For example, the transcription application may determine the position of the cursor. The transcription application may then identify the appropriate message segment corresponding to the transcriber's focus, at block 410, and the transcription application may begin the presentation of the data of the appropriate message segment, at block 412. At block 414, the transcription application monitors the transcriber's activity, such as the transcriber's typing activity, and the transcription application adjusts the presentation of the message data to synchronize such presentation with the transcriber's activity at block 416. At block 418, the transcription application determines whether the transcriber has completed the message. If determined that the transcriber has not completed the message, the application's operation loops back to block 408 to determine the transcriber's new focus, but if determined that the transcriber has completed the message, the application's operation may end at block 420.

As described herein, a most preferred embodiment is implemented with an enhanced messaging system that allows messages comprising various types of data, such as audio (e.g., voice), DTMF, image, video, text, fax, e-mail, and other data types. Although, in alternative embodiments, such transcription may be implemented with a messaging system that allows only a particular type of data for messages, such as voice messages. It should be understood that a preferred embodiment can be utilized not only within call centers and other messaging centers that receive inbound messages via a network, but may also be implemented within such messaging centers that receive direct input of information to be transcribed, such as a computer system that allows a user to record audio and/or other information (message) to be transcribed.

It shall be understood that a transcription application as described herein for performing enhanced transcription may be implemented in computer executable software code, hardware, or a combination thereof, and any such implementation is intended to be within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of performing enhanced transcription of a message, the method comprising:

accessing data of a message to be transcribed, wherein said data includes a plurality of portions;

converting non-text portions of said data to text;

automatically transcribing said data of said message in appropriate fields of a plurality of fields of a data entry form, wherein each of said plurality of fields enables input of text data from a transcriber;

indicating a level of confidence for said automatically transcribed data to a transcriber;

monitoring transcription activity of the transcriber; and presenting respective non-text portions of said data to the transcriber in synchronization with transcription activity in respective ones of said plurality of fields.

2. The method of claim 1, further comprising:

determining the focus of said transcriber and automatically presenting the appropriate non-text portion of said message according to said focus.

3. The method of claim 2, wherein said determining the focus further comprises:

determining the position of the cursor on a computer screen being used by said transcriber to perform transcription.

4. The method of claim 2, further comprising:

monitoring said transcriber's typing activity and automatically adjusting presentation of said non-text data of said message to synchronize said presentation with said typing activity.

5. The method of claim 4, wherein said non-text portions of said data of said message is audio data, further comprising:

adjusting the speed of audibly presenting said audio data of said message to synchronize said audio data with said typing activity.

6. The method of claim 4, wherein said non-text portions of said data is non-audio data, further comprising:

adjusting a display of said non-audio data of said message to synchronize said display of said non-audio data with said typing activity.

7. The method of claim 1, wherein said data is selected from the group consisting of audio, image, text, video, DTMF, fax, and e-mail data types.

8. The method of claim 1, wherein said data of said message comprises multiple types of data.

9. The method of claim 1, wherein said data of said message comprises non-audio data.

10. The method of claim 1, wherein said indicating further comprises highlighting said automatically transcribed data in a particular color corresponding to a determined confidence level.

11. The method of claim 1, wherein said data for said message is received by a messaging system via a network selected from the group consisting of a PSN, a proprietary network, a general purpose processor-based information network, dedicated communication lines, a satellite system, a cable system, a computer network, direct device to device connection, a local area network (LAN), a wide area network (WAN), modem to modem connection, an Intranet, the Internet, and any combination thereof.

12. The method of claim 11, wherein said message is a telephony message.

13. A method of performing enhanced transcription of a message, the method comprising:
   accessing data of a message to be transcribed, wherein said data comprises a plurality of portions;
   presenting said data to a transcriber;
   monitoring activity of said transcriber that is associated with transcription of said message; and
   wherein said presenting automatically synchronizes presentation of respective non-text portions of said data of said message with said activity of said transcriber.

14. The method of claim 13, further comprising:
   determining the focus of said transcriber during transcription of said message and automatically presenting the appropriate portion of said message according to said focus.

15. The method of claim 14, wherein said determining the focus further comprises:
   determining the position of the cursor on a computer screen being used by said transcriber to perform transcription.

16. The method of claim 13, further comprising:
   monitoring said transcriber's typing activity in transcribing said message and automatically adjusting presentation of said data of said message to synchronize said presentation with said typing activity.

17. The method of claim 16, wherein said data of said message is audio data, further comprising:
   adjusting the speed of audibly presenting said audio data of said message to synchronize said audio data with said typing activity.

18. The method of claim 16, wherein said data is non-audio data, further comprising:
   adjusting a display of said non-audio data of said message to synchronize said display of said non-audio data with said typing activity.

19. The method of claim 13, further comprising:
   automatically transcribing at least a portion of said data of said message, wherein said transcriber is not required to manually transcribe said automatically transcribed portion.

20. The method of claim 19, wherein said automatically transcribing comprises converting non-text portions of said data to text.

21. The method of claim 19, further comprising:
   automatically populating fields of a data entry screen with appropriate information from said message.

22. The method of claim 21, wherein said data is segmented into segments that correspond with said data entry fields.

23. The method of claim 19, further comprising:
   indicating a level of confidence to said transcriber for said automatically transcribed data.

24. The method of claim 23, wherein said indicating further comprises highlighting said automatically transcribed data in a particular color corresponding to a determined confidence level.

25. The method of claim 23, wherein said indicating comprises:
   indicating a level of confidence in converting non-text portions of said data to text.

26. A system for performing enhanced transcription of a message, the system comprising:
   a processor executing computer executable software code;
   said computer executable software code comprising:
      code for accessing data of a message to be transcribed, wherein said data comprises a plurality of portions;
      code for monitoring activity of a transcriber that is associated with transcription of said message;
      code for automatically synchronizing the presentation of respective non-text portions of said data of said message to said transcriber with said activity of said transcriber; and
   a means for automatically transcribing said message.

27. The system of claim 26, wherein said means for automatically transcribing said message further comprises a means for converting non-text portions of said data to text.

28. The system of claim 26, wherein said computer executable software code further comprises:
   code for automatically transcribing said data of said message in appropriate fields of a data entry form.

29. The system of claim 26, further comprising:
   a messaging system that receives said data for said message from a communicating party via a network.

30. The system of claim 29, wherein said network is selected from the group consisting of a PSN, a proprietary network, a general purpose processor-based information network, dedicated communication lines, a satellite system, a cable system, a computer network, direct device to device connection, a local area network (LAN), a wide area network (WAN), modem to modem connection, an Intranet, the Internet, and any combination thereof.

31. The system of claim 29, wherein said messaging system is a telephony messaging system and said message is a telephony message.

32. An enhanced transcription application for performing transcription of a message, said application comprising:
   computer executable software code for accessing data of a message to be transcribed, wherein said data comprises a plurality of portions;
   computer executable software code for presenting said data of said message to a transcriber for transcription; and
   computer executable software code for monitoring activity of a transcriber that is associated with transcription of said message and automatically synchronizing presentation of respective non-text portions of said data with said activity of said transcriber in transcribing said message.

33. The application of claim 32, further comprising:
   computer executable software code for determining the focus of said transcriber during transcription of said message and automatically presenting the appropriate portion of said message according to said focus.

34. The application of claim 33, wherein said computer executable software code for determining the focus further comprises:
   computer executable software code for determining the position of the cursor on a computer screen being used by said transcriber to perform transcription.

35. The application of claim 32, further comprising:

computer executable software code for monitoring said transcriber's typing activity in transcribing said message and automatically adjusting presentation of said data of said message to synchronize said presentation with said typing activity.

36. The application of claim 35, wherein said data of said message is audio data, further comprising:

computer executable software code for adjusting the speed of audibly presenting said audio data of said message to synchronize said audio data with said typing activity.

37. The application of claim 32, further comprising:

computer executable software code for automatically transcribing said data of said message.

38. The application of claim 37, wherein said data of said message is selected from the group consisting of audio, DTMF, video, image, text, and fax.

* * * * *